United States Patent [19]

Newhouse

[11] Patent Number: 4,728,840

[45] Date of Patent: Mar. 1, 1988

[54] WATER-COOLED AC AND DC MOTOR-GENERATOR SET ON A COMMON SHAFT WITH SERIES COOLING FLOW PATH

[75] Inventor: Brian L. Newhouse, Apollo, Pa.

[73] Assignee: Westinghouse Electric Corp., Pittsburgh, Pa.

[21] Appl. No.: 26,250

[22] Filed: Mar. 16, 1987

[51] Int. Cl.⁴ .............................................. H02K 47/18
[52] U.S. Cl. ...................................... 310/113; 310/54; 310/59; 310/61; 310/64
[58] Field of Search .................... 310/113, 112, 102 R, 310/52, 114, 61, 54, 60 R, 60 A, 58, 59, 53, 64, 65, 165, 261

[56] References Cited

U.S. PATENT DOCUMENTS 1,301,845  4/1919  Hellmund ............................... 310/53
2,615,938  10/1952  Gynt ..................................... 310/113

*Primary Examiner*—R. Skudy

[57] ABSTRACT

A motor-generator set includes a rotatable central shaft and an AC rotor and a DC rotor being supported in tandem relationship along the shaft for rotation therewith. A liquid coolant flow path is defined in a series relationship through the shaft and rotors. A first portion of the serial liquid coolant flow path runs into and through a first single bore in one end portion of the shaft, a second portion of the serial flow path runs through the AC rotor, a third portion of the serial flow path runs through a middle portion of the shaft, a fourth portion of the serial path runs through the DC rotor, and a fifth portion of the serial flow path runs through and from an opposite end of the shaft. The middle and opposite end portions of the shaft, providing the third and fifth portions of the serial flow path, are formed by opposing end sections of a second single bore in the shaft and a plug disposed in a middle section of the second bore so as to substantially sealably isolate the opposing end sections from one another.

20 Claims, 3 Drawing Figures

WATER-COOLED AC AND DC MOTOR-GENERATOR SET ON A COMMON SHAFT WITH SERIES COOLING FLOW PATH

The invention described herein was made in the course of work performed under Contract No. N-00024-83-C-4181 awarded by the United States Government.

CROSS REFERENCE TO RELATED APPLICATION

Reference is hereby made to the following copending application dealing with related subject matter and assigned to the assignee of the present invention: "Internally-Located Rotating Union for a Motor-Generator Set" by Brian L. Newhouse, assigned U.S. Ser. No. 042,184 and filed 4/24/87.

BACKGROUND OF THE INVENTION

1. Field of the Invention

The present invention relates generally to secondary power sources and, more particularly, is concerned with a water-cooled AC and DC motor-generator set employing AC and DC side rotors in a tandem arrangement on a common shaft with a series cooling flow path defined through the shaft and rotors.

2. Description of the Prior Art

A secondary power source is typically provided in a nuclear submarine to generate reserve power. As the primary power source of the submarine, its nuclear power plant, is operated to power the submarine, it also powers the secondary power source to charge DC batteries. Then, during periods when the nuclear plant is shut down or knocked off-line, the reserve power of the DC batteries is used to restart the primary source to operate the submarine.

One typical secondary power source used heretofore employs an AC and DC motor-generator set in which the AC and DC components are disposed in tandem arrangement on and along a common solid shaft. During periods of nuclear power plant operation, the AC component functions as a motor to rotatably drive the common shaft and thereby run the DC component as a generator to charge the DC batteries. Then, during periods when the nuclear power plant is shut down, the DC batteries operates the DC component as a motor to rotatably drive the common shaft and thereby run the AC component as a generator to operate the submarine.

Historically, the AC and DC components were cooled by air flow about the peripheries thereof. Air cooled systems are noisey due to the vane turbulence of their fans. Further, air cooling can draw silicon resin vapors onto the electrical contact brushes which reduces their useful life. And still further, with the new higher power densities demanded of these components, more heat is generated and they are noisier. In view of the criticality of and need to conserve space and weight in a submarine as well as for the submarine to operate quietly, a primary objective in the design of its components, which includes the components of the motor-generator set, must be to minimize their size and weight. It is perceived that the adoption of a way to cool the motor-generator set by water as opposed to air might offer opportunities to further reduce its size and weight over what has been achieved heretofore and also to operate more quietly.

Generally, internal circulation of liquid coolant through rotor shafts of turbine generators and motors to cool the rotor shaft and windings is well known. Representative of the prior art are the liquid coolant flow arrangements disclosed in U.S. Pat. Nos. to Willyoung et al (3,056,055), Krastchew (3,240,967), Stark et al (3,475,631), Heard et al (3,476,961, Guthan (3,519,861), Curtis et al (3,733,502); 3,740,596; and 3,868,520), Heller et al (3,742,266), Albaric et al (4,114,059), Linscott, Jr. (4,203,044) and Okamoto et al (4,358,937). While many liquid coolant flow arrangements of the prior art, such as those of the aforecited patents, would appear to operate reasonably well and generally achieve their objectives under the limited range of operating conditions for which they were designed, most seem to embody shortcomings which make them less than an optimum arrangement for water coolant flow through a motor-generator set in a nuclear submarine. Some arrangements provide both inlet and discharge of the coolant flow at the same end of the shaft which requires additional means to physically separate flow paths through the entire length of the shaft and introduces the possibility of undesirable heat transfer between the flow paths that would decrease the overall thermal efficiency of the cooling system. In addition, the possibility is raised of trapping air at the closed end of the shaft during the initial filling of the cooling system. Also, certain arrangements require circulation of a large volume of liquid within the rotating components which during high-speed rotational operation thereof may result in the occurrence of unpredictable vortices that will disrupt the desired flow patterns. Finally, many prior art arrangements require a large number of parts which reduce reliability and increase manufacturing and assembling costs.

Consequently, a need exists for a design which provides coolant flow through the motor-generator set in a manner which avoids the aforementioned shortcomings without introducing others in their place.

SUMMARY OF THE INVENTION

The present invention provides features which are designed to satisfy the aforementioned needs. The present invention provides a motor-generator set having AC and DC side rotors mounted on a common shaft with a simple once-through flow path defined through the shaft and the rotors. Cooling water enters and exits through opposite ends of the shaft, making it less likely to trap air during filling. Better fluid flow is predicted because the volume of internal rotation bodies of water is reduced and thus adverse vortex effects are less likely. With series flow, positive pressure forces flow through the AC and DC rotors. Further, the heat transfer rate by coupling the AC side and DC side rotors in direct series is better than if connected in parallel with the flow through the shaft. This is because the flow rate is doubled through the AC and DC side rotors and the film coefficient factor is greatly increased which has major benefit to the heat transfer rate. The design is simple to manufacture and has high heat transfer and predictable flow for direct cooling of the attached rotors as well as the shaft. In addition, the internal once-through flow path will partially cool two externally mounted brushless exciters, external shaft bearings, and the surge suppressor. The design results in a motor-generator set in which weight, volume and moise have been minimized and performance maximized.

Accordingly, the present invention is directed to a motor-generator set comprising the combination of a rotatable central shaft, an AC rotor and a DC rotor with the AC and DC rotors being supported in tandem relationship along the shaft for rotation therewith. Also, the motor-generator set includes means defining a coolant flow path in a series relationship through the shaft and rotors wherein liquid coolant flows initially into and through one end portion of the shaft, next through one of the rotors, then through a middle portion of the shaft, thereafter through the other of the rotors, and finally through and from an opposite end of the shaft.

More particularly, the one rotor is the AC rotor and the other rotor is the DC rotor. Also, the coolant flow path defining means includes a single flow passage defined through each of the one end, middle and opposite end portions of the shaft, with the passages being axially spaced apart from one another. Further, the coolant flow path defining means also includes a multiplicity of parallel flow passages defined through each of the rotors which interconnect in flow communication respective ones of the single passages defined through the shaft portions. The multiplicity of parallel flow passages defined through each of the rotors extend in both radial relationship with respect to the shaft and in circumferentially spaced relationship with respect to one another about the shaft.

Still further, two of the single flow passages being defined through the middle portion of the shaft and one of the one end and opposite end portions of the shaft are formed by a first single axial bore defined in the shaft and an elongated plug disposed in the bore so as to substantially isolate opposing end sections of the bore from flow communication with one another and thereby provide the two of the single flow passages. The third of the single flow passages being defined through the other of the one end and opposite end portions of the shaft is formed by a second single axial bore defined in the shaft and axially spaced from the first single axial bore. The first axial bore is greater in length than the second axial bore.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
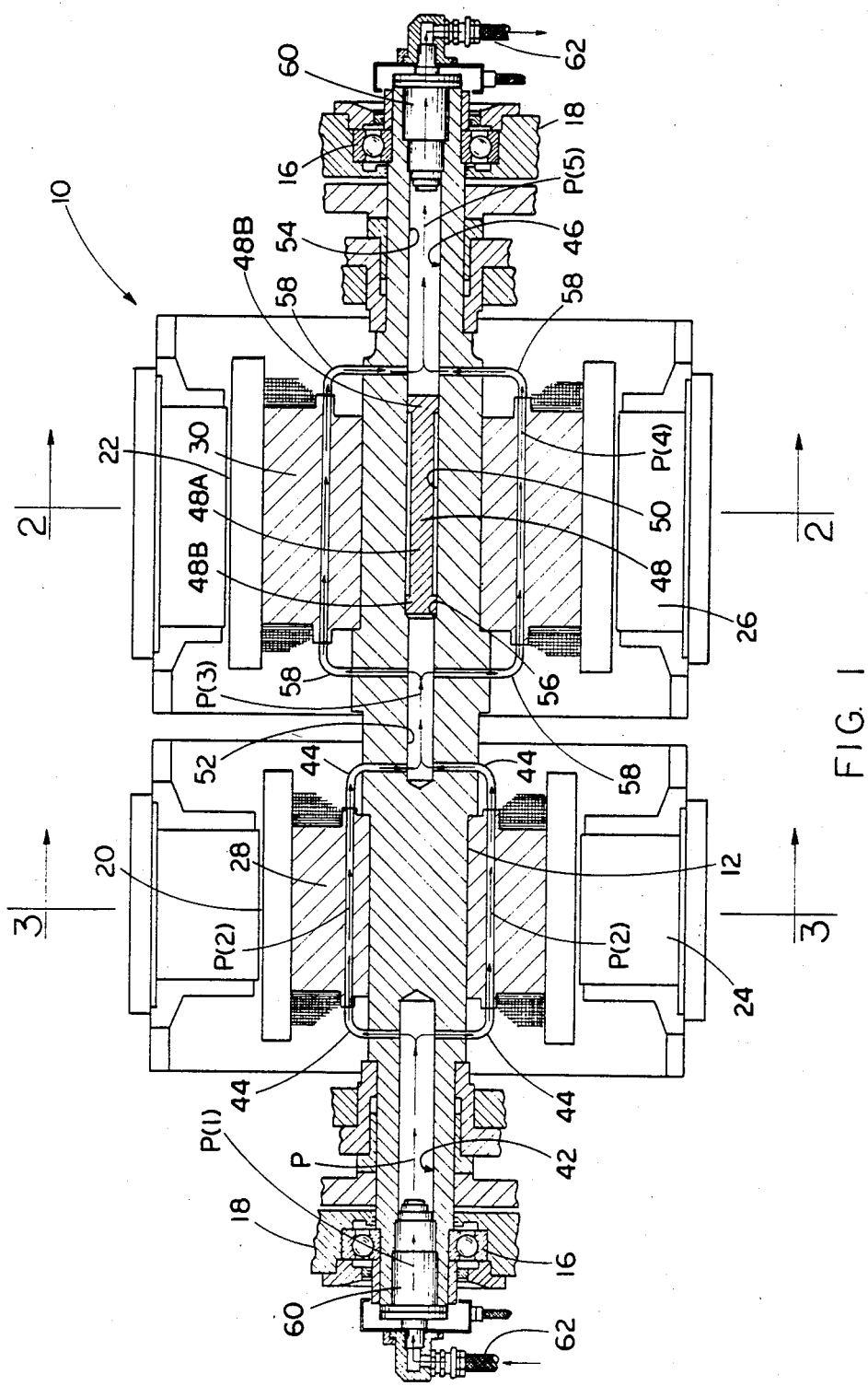
FIG. 1 is a longitudinal axial sectional view of the motor-generator set of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
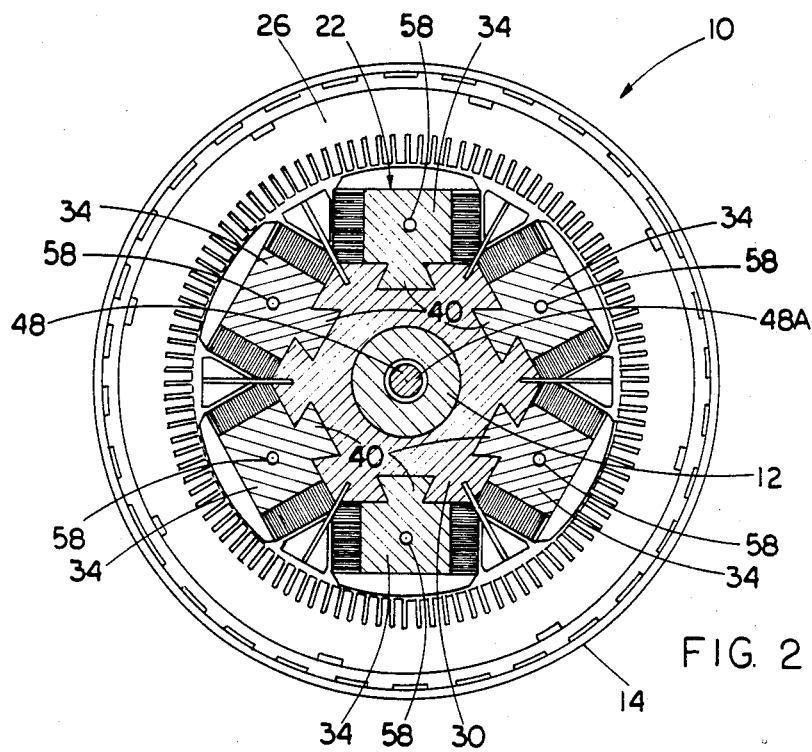
FIG. 2 is a cross-sectional view of the DC side rotor and shaft of the motor-generator set of FIG. 1.
Figure 3:
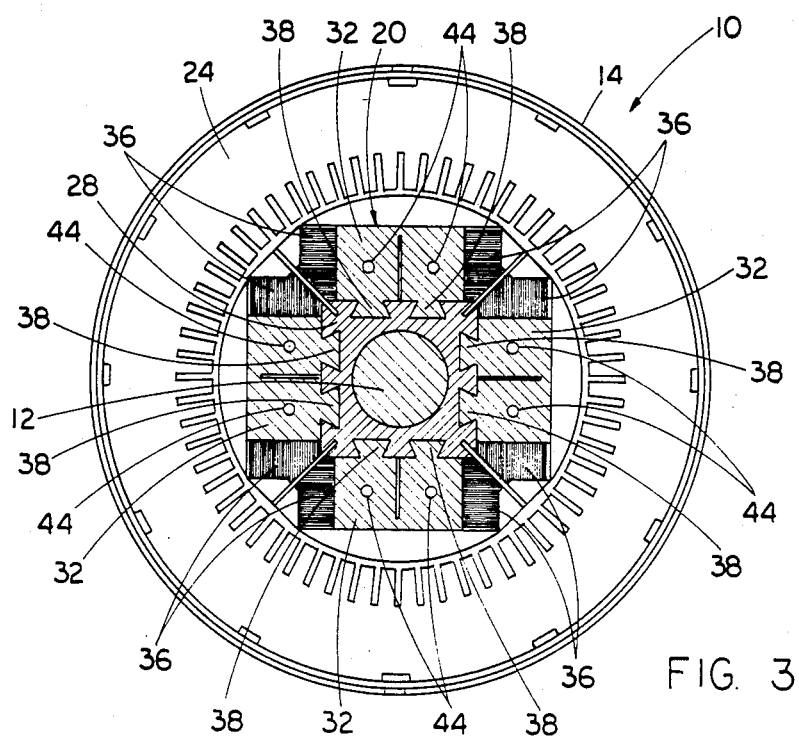
FIG. 3 is a cross-sectional view of the AC side rotor and shaft of the motor-generator set of FIG. 1.

Referring now to the drawings, and particularly to FIG. 1, there is shown a motor-generator set, generally designated by the numeral 10 and constituting the preferred embodiment of the present invention. Basically, the motor-generator set 10 includes a generally cylindrical central shaft 12 extending through a sealed housing 14 (FIGS. 2 and 3) and being rotatably mounted at its opposite ends by bearings 16 which, in turn, are supported by end portions 18 of the housing. The set 10 also includes annular-shaped AC and DC rotors 20, 22 supported in tandem relationship along the central shaft 12 for rotation therewith, and annular-shaped stator cores 24, 26 which encompass the respective rotors 20, 22 in closely spaced relationship thereto. The rotors 20, 22 include respective central mounting portions 28, 30 being secured to the central shaft 12 and having respective pluralities of poles 32, 34 attached thereon. The poles 32 have windings 36 provided about them, as do the poles 34 although their windings are not shown. As seen in FIG. 3, the poles 32 of the AC rotor 20 have double dovetails 38 for attaching the poles to the central mounting portion 28 of the rotor. On the other hand, as seen in FIG. 2, the poles 34 of the DC rotor 22 have single dovetails 40 for attaching the poles 34 to the central mounting portion 30 of the rotor.

Also, in accordance with the principles of the present invention, a liquid coolant flow path, generally indicated by the arrows P in FIG. 1, is defined in a series relationship through the shaft 12 and the rotors 20, 22. A first portion P(1) of the serial liquid coolant flow path P runs into and through the left end portion of the shaft 12, a second portion P(2) of the serial flow path runs through the AC rotor 20, a third portion P(3) of the serial flow path runs through a middle portion of the shaft 12, a fourth portion P(4) of the serial path runs through the DC rotor 22, and a fifth portion P(5) of the serial flow path runs through and from the right end portion of the shaft.

A plurality of means define the portions P(1)–(5) of the liquid coolant flow path P in the series relationship through the central shaft 12 and the rotors 20, 22. The first of the plurality of means is a first single axial bore 42 and the first path portion P(1) is a first single flow passage defined by the first single bore 42 through the left end portion of the shaft 12. The second of the plurality of means is a first multiplicity of conduits 44 which interconnect in flow communication the first axial bore 42 and a third of the plurality of means which will be described next. The second path portions P(2) is a first multiplicity of flow passages defined by the first multiplicity of conduits 44 through the AC rotor 20.

The third of the plurality of means is a second single axial bore 46 defined in the shaft 12 from its middle portion through its right end portion. Also, an elongated plug 48 is disposed in a middle section 50 of the second axial bore 46 so as to isolate first and second opposing end sections 52, 54 of the bore 46 from flow communication with one another. The second axial bore 46 and inserted plug 48 provide separate second and third single flow passages constituting the third and fifth portions P(3), P(5) of the liquid coolant flow path P. The multiplicity of flow passages defined by the first multiplicity of conduits 44 through the AC rotor 20 interconnect in flow communication the first and second single passages defined through the left end and middle portions of the shaft 12.

More particularly, the shaft is machined so as to produce the middle and second opposing end sections 50, 54 of the second axial bore 46 with a greater diameter than the first opposing end section 52 so as to form a transition shoulder 56. The plug 48 is slightly less in diameter than the middle and second opposing end sections 50, 54 of the second axial bore 46, but slightly greater in diameter than the first opposing end section 52 thereof so as to allow insertion of the plug through the sections 50, 54 into an interference fit with the middle section 50 and abutting engagement with the transition shoulder 56. The mid section 48A of the plug has a smaller diameter than the opposite end section 48B thereof to enable the plug 48 to be more easily pushed into the bore 46. As seen in FIG. 1, the second axial bore 46 is axially spaced from and substantially greater in length than the first axial bore 42.

The fourth of the plurality of means is a second multiplicity of conduits 58 which interconnect in flow communication the first and second opposing end sections 52, 54 of the second axial bore 46. The fourth path portion P(4) is a second multiplicity of flow passages defined by the second multiplicity of conduits 58 through the DC rotor 22 which interconnect in flow communication the second and third single passages defined through the middle and right end portions of the shaft 12.

As shown in FIGS. 1-3, the respective first and second multiplicities of conduits 44, 58 extend in both radial relationship with respect to the common central shaft 12 and in circumferentially spaced relationship with respect to one another about the shaft. In such relationships to the shaft 12, the passages of each of the first and second multiplicities of flow passages defined through the respective AC and DC rotors 20, 22 extend in generally parallel relationship to one another.

As depicted in FIG. 1, liquid coolant enters the first axial bore 42 at the left end of the shaft 12 and exits the second axial bore 46 at the right end of the shaft 12 via internally-located rotary unions 60 which are the invention of the patent application cross-referenced above. However, any suitable external rotary union could also be used. The unions 60 are maintained in a stationary relationship to the rotatable shaft 12 as liquid coolant is routed through them from and to respective hoses 62.

It should be readily apparent that the heat transfer rate by coupling the AC side and DC side rotors 20, 22 in direct series is better than if connected in parallel with the shaft. The reason for this is that when the flow rate is substantially increased, the film coefficient factor is greatly increased. In addition, the overall cooling of the AC side rotor is much greater due to the increased flow rate through it. From a fluid mechanics standpoint, the shaft internal geometry of series flow paths positively insures sufficient forced flow through the AC and DC side rotors. Additionally, the possible vortex blockage effects or the possibility of trapping air should not exist with this design. From a manufacturing standpoint, this design of internal shaft geometry requires a minimum amount of machining. The total number of parts is two, the one-piece shaft forging and the solid plug insert. The overall unit cost, when compared to other possible internal shaft geometries, is more favorable in the case of the design of the present invention.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a motor-generator set, the combination comprising:
    (a) a rotatable central shaft;
    (b) an AC rotor;
    (c) a DC rotor, said AC and DC rotors being supported in tandem relationship along said shaft for rotation therewith; and
    (d) means defining a coolant flow path in a series relationship through said shaft and rotors wherein liquid coolant flows initially into and through one end portion of said shaft, next through one of said rotors, then through a middle portion of said shaft, thereafter through the other of said rotors, and finally through and from an opposite end of said shaft.

2. The motor-generator set as recited in claim 1, wherein said one of said rotors is said AC rotor and said other of said rotors is said DC rotor.

3. The motor-generator set as recited in claim 1, wherein said coolant flow path defining means includes a single flow passage defined through each of said one end, middle and opposite end portions of said shaft.

4. The motor-generator set as recited in claim 3, wherein said single flow passages defined through said respective shaft portions are axially spaced apart from one another.

5. The motor-generator set as recited in claim 3, wherein said coolant flow path defining means also includes a multiplicity of parallel flow passages defined through each of said rotors which interconnect in flow communication respective ones of said single passages defined through said shaft portions.

6. The motor-generator set as recited in claim 5, wherein said multiplicity of parallel flow passages through each of said rotors extend in both radial relationship with respect to said shaft and in circumferentially spaced relationship with respect to one another about said shaft.

7. The motor-generator set as recited in claim 3, wherein two of said single flow passages being defined through said middle portion of said shaft and one of said one end and opposite end portions of said shaft are formed by one single axial bore defined in said shaft and an elongated plug disposed in said bore so as to isolate opposing end portions of said bore substantially from flow communication with one another and thereby provide said two of said single flow passages.

8. The motor-generator set as recited in claim 7, wherein a third of said single flow passages being defined through the other of said one end and opposite end portions of said shaft is formed by another single axial bore defined in said shaft and being axially spaced from said one single axial bore.

9. The motor-generator set as recited in claim 8, wherein said one axial bore is greater in length than said another axial bore.

10. In a motor-generator set, the combination comprising:
    (a) a rotatable central shaft;
    (b) an AC rotor;
    (c) a DC rotor, said AC and DC rotors being supported in tandem relationship along said shaft for rotation therewith; and
    (d) a plurality of means defining a liquid coolant flow path in a series relationship through said shaft and rotors wherein a first of said means defines a first portion of said liquid coolant flow path into and through one end portion of said shaft, a second of said means defines a second portion of said liquid coolant flow path through one of said rotors, a third of said means defines a third portion of said liquid coolant flow path through a middle portion of said shaft, and a fourth of said means defines a fourth portion of said liquid coolant flow path through the other of said rotors, said third means also defining a fifth portion of said liquid coolant flow path through and from an opposite end of said shaft.

11. The motor-generator set as recited in claim 10, wherein said one of said rotors is said AC rotor and said other of said rotors is said DC rotor.

12. The motor-generator set as recited in claim 10, wherein said first means is a first single axial bore and said first path portion defined by said first means is a first single flow passage defined by said first single bore through said one end portion of said shaft.

13. The motor-generator set as recited in claim 12, wherein said third means is a second single axial bore defined in said shaft from said middle portion through said opposite end portion thereof and an elongated plug disposed in a middle section of said second axial bore so as to sealably isolate first and second opposing end sections of said bore from flow communication with one another and thereby provide separate second and third single flow passages constituting said third and fifth portions of said liquid coolant flow path.

14. The motor-generator set as recited in claim 13, wherein:
said middle and second opposing end sections of said second axial bore are greater in diameter than said first opposing end section thereof so as to form a transition shoulder; and
said plug is slightly less in diameter than said middle and second opposing end sections of said second axial bore and slightly greater in diameter than said first opposing end section of said second axial bore so as to allow insertion of said plug therethrough into an interference fit with said middle section and abutting engagement with said transition shoulder.

15. The motor-generator set as recited in claim 13, wherein said second axial bore is axially spaced from and greater in length than said first axial bore.

16. The motor-generator set as recited in claim 13, wherein said second means is a first multiplicity of conduits which interconnect in flow communication with said first axial bore and said first opposing end section of said second axial bore, and said second path portion is a first multiplicity of flow passages defined by said first multiplicity of conduits through said one rotor which interconnect in flow communication said first and second single passages defined through said one end and middle portions of said shaft.

17. The motor-generator set as recited in claim 13, wherein said fourth means is a second multiplicity of conduits which interconnect in flow communication said first and second opposing end sections of said second axial bore, and said fourth path portion is a second multiplicity of flow passages defined by said second multiplicity of conduits through said other rotor which interconnect in flow communication said second and third single passages defined through said middle and opposite end portions of said shaft.

18. The motor-generator set as recited in claim 10, wherein said second means is a multiplicity of conduits and said second path portion is a multiplicity of flow passages defined by said multiplicity of conduits through said one rotor.

19. The motor-generator set as recited in claim 10, wherein said third means is formed by a single axial bore defined in said shaft from said middle portion through said opposite end portion thereof and an elongated plug disposed in said bore so as to isolate opposing end sections of said bore substantially from flow communication with one another and thereby provide separate single flow passages constituting said third and fourth portions of said liquid coolant flow path.

20. The motor-generator set as recited in claim 10, wherein said fourth means is a multiplicity of conduits and said fourth path portion is a multiplicity of flow passages defined by said multiplicity of conduits through said other rotor.

* * * * *